Dec. 24, 1968  V. BERBERIAN  3,417,801
SELF-LOCKING NUT AGAINST VIBRATIONS
Filed April 19, 1966  2 Sheets-Sheet 1
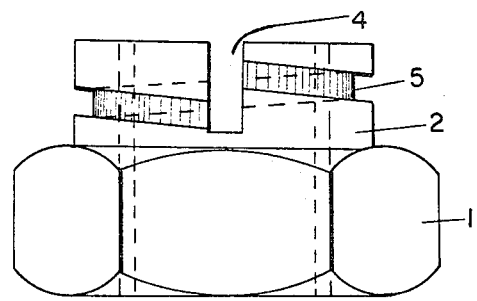
Fig. 1
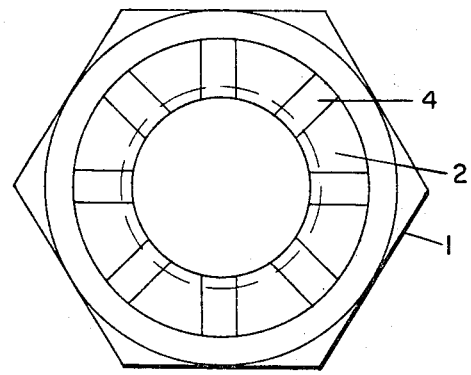
Fig. 2
Fig. 3
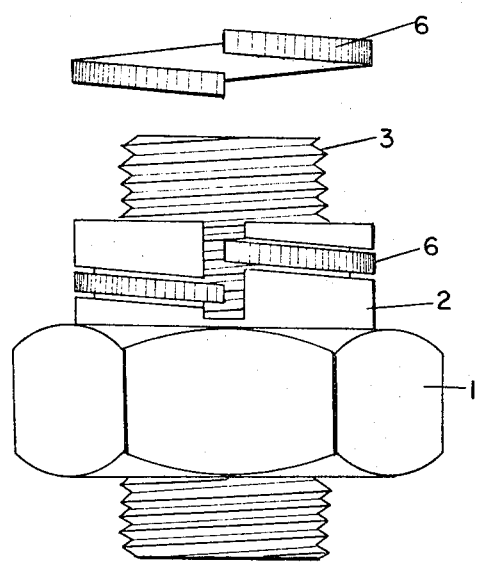
Fig. 4

United States Patent Office 3,417,801
Patented Dec. 24, 1968

3,417,801
SELF-LOCKING NUT AGAINST VIBRATIONS
Vartan Berberian, Maisons Alfort, France, assignor to Bemex, Cusset (Allier), France, a society of France
Filed Apr. 19, 1966, Ser. No. 543,601
Claims priority, application France, May 17, 1965, 17,316
1 Claim. (Cl. 151—21)

ABSTRACT OF THE DISCLOSURE

A self-locking nut having a slotted prolongation formed with a helicoidal groove, which tightly receives a helicoidal resilient ring to bind the nut against a threaded rod. The pitch of the groove and ring are inverse to that of the nut, so that the binding action is somewhat relaxed while the nut is being tightened, but is fully effective when the nut is stationary.

The invention, in brief, is a self-locking nut for a bolt or threaded stud, which is so constructed that in use it will not damage the threads of the bolt. The nut is of a cross-sectional shape adapted to be grasped for turning with a wrench, for example hexagonal or square, and has an axially extending ring thereon. The ring is internally threaded as a continuation of the threads of the nut, and is provided with a plurality of radial slots so that axially extending inwardly compressible fingers are provided.

An external peripheral helical groove is provided on the fingers of the ring, the pitch of this groove being opposite to that of the threads of the nut. Into this groove is fitted a spring ring which urges the fingers inwardly against the bolt or stud on which the nut is threaded.

A first object of the invention is to produce a nut that is self-locking against vibrations, operates easily and capable of being used several times without reducing the effectiveness of the self-locking device.

Another object of the invention is to produce a self-locking nut that does not run the risk of causing damage to the threads in contact.

Figure 5:
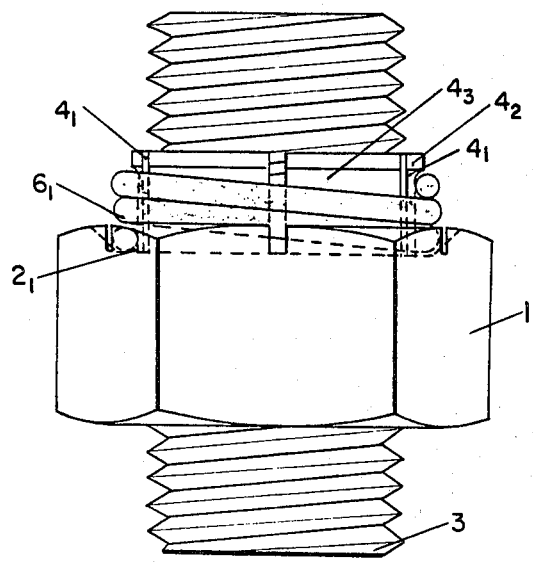
Figure 6:
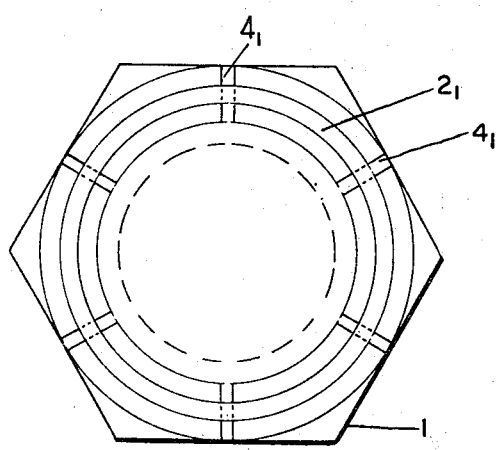

Other objects and advantages will be revealed by the description, claim and attached drawings, in which:
FIGURE 1 is an elevation view of the nut;
FIGURE 2 shows the same nut seen from above;
FIGURE 3 is a view of a resilient tightening ring;
FIGURE 4 is a view showing the nut screwed on to a threaded rod;
FIGURE 5 is a view showing another method of execution;
FIGURE 6 shows the nut of FIGURE 5 seen from above.

The nut 1 according to the invention is prolonged on one of its cross faces by a ring 2 with a thread of the same pitch as the nut.

The ring 2 is sufficiently thin to be subjected to radial tightening in the direction of the threaded rod 3 on to which the nut is screwed. To this end, the ring 2 is provided with a series of radial slots 4 delimiting tongues assuming in cross section the shape of sectors in arc of a circle.

In the example of FIGURES 1 and 4, the ring 2 is provided externally with a groove 5 intended to receive a resilient ring 6 exterting a permanent contraction on the tongues of the ring. In this first method of execution, the groove 5 receiving the resilient ring is open, is helicoidal by an inverse pitch to the thread of the nut, so that when the nut is tightened, there is a tendency to free the diametrical contraction exerted on the threaded rod 3. When the tightening action of the nut 1 ceases, the helicoidal resilient open ring 6 causes, on the contrary, a diametrical contraction of the tongues of the ring 2 whose threaded part engages on the thread of the threaded rod thus effecting a locking making the nut self-locking against vibrations.

In the method of execution shown in FIGURES 5 and 6, the ring 2 of the self-locking nut 1 is provided externally with a circular groove $4_1$ bordered at its top part by a collar $4_2$.

The ring 2 is provided with six slots $4_1$ dilimiting six segments $4_3$ shaped in the arc of a circle. The groove 2 extends by prolongation $2_1$ made in the thick part of the body 1 of the nut end and in which the first turn of an open spiral spring $6_1$ is housed, comprising, in the example shown, 2 semipointed turns, wound left whereas the thread of the threaded rod 3 has a right-hand pitch.

The tension of the spring, its section, its pitch and material, can vary according to the purposes required of it.

What I claim is:
1. A nut self-locking against vibrations comprising a main body portion having wrenching means thereon and having a generally tubular portion extending from one end thereof, said tubular portion being of less traverse dimension than said main body portion forming a radial peripheral shoulder therebetween, a continuous threaded bore extending throughout both portion of said nut, said tubular portion having a plurality of spaced radial slots forming sectors shaped in cross-section in the arc of a circle, an open resilient ring tightly engaging said tubular portion to compress said sectors, the resilient ring comprising several helical turns of a pitch opposite to that of the threads in the bore, said ring being received in a corresponding helical groove in said tubular portion, an end turn of said ring being housed in a cavity defining a continuation of said groove, said cavity being provided in the main body portion of the nut, the other end turn bearing against a radial collar provided at the outer end of said tubular portion.

References Cited

UNITED STATES PATENTS

| 2,424,604 | 7/1947 | Dzus. |
| 2,562,621 | 7/1951 | Larson. |
| 3,180,387 | 4/1965 | Dzus et al. |

FOREIGN PATENTS

| 516,482 | 1/1953 | Belgium. |
| 1,003,909 | 11/1951 | France. |

CARL W. TOMLIN, *Primary Examiner.*

RAMON S. BRITTS, *Assistant Examiner.*